United States
Deserno et al.

[11] 3,739,281
[5] June 12, 1973

[54] SYSTEM FOR JAMMING WIRELESS COMMUNICATIONS

[75] Inventors: Peter Deserno; Friedrich Kauderer, both of Munich; Hans Prost, Munich-Solln, all of Germany

[73] Assignee: Siemens Aktiengesellschaft, Munich, Germany

[22] Filed: July 25, 1963

[21] Appl. No.: 298,525

[30] Foreign Application Priority Data
July 31, 1962 Germany .......................... S 80666

[52] U.S. Cl. .............................................. 325/132
[51] Int. Cl. ............................................. H04k 3/00
[58] Field of Search ...................................... 325/132

[56] References Cited
UNITED STATES PATENTS
2,885,543  5/1959  Williams ............................. 325/132
2,985,754  5/1961  Grieg et al. ......................... 325/132
3,038,067  6/1962  Dench et al. ....................... 325/132

*Primary Examiner*—Benjamin A. Borchelt
*Assistant Examiner*—H. A. Birmiel
*Attorney*—Hill, Sherman, Meroni, Gross & Simpson

EXEMPLARY CLAIM

1. In a system for jamming wireless communications with the aid of a searching receiver for ascertaining senders which are engaged in the transmission of messages, a powerful jamming transmitter for radiating jamming signals on the waves of ascertained senders, whereby said receiver and transmitter are alternately operative to ascertain transmitting senders and to transmit jamming signals, respectively, which comprises means at the searching receiver for converting received frequency signals into lower frequency ranges, means for successively converting said lower frequency range signals into a plurality of individual ranges, mans forming a group of frequency-analyzing channels, means for connecting said frequency-analyzing channel means to respective outputs of said plurality of individual ranges, whereby each individual range is searched for frequencies therein by the common group of frequency-analyzing channels, means operatively connected to said frequency-analyzing channel means responsive upon ascertainment of a signal thereby, to effect jamming transmission corresponding to the received frequency of such ascertained signal.

17 Claims, 4 Drawing Figures

SYSTEM FOR JAMMING WIRELESS COMMUNICATIONS

The invention disclosed herein is concerned with a system for jamming wireless communications and may be considered as an improvement on the system disclosed in copending application Ser. No. 154,913, filed Sept. 18, 1961, which is owned by the assignee named in the present case.

The system disclosed in the above indicated copending application comprises a tracking or searching receiver and a powerful jamming transmitter, for alternatively ascertaining senders which are engaged in transmitting and radiating jamming signals on the wave length of the respective ascertained senders, the tracking receiver searching within a wide wave range, in a multitude of mutually bordering narrow receiving channels, for senders which are transmitting. Senders which are thus in one or more of these receiving channels ascertained as being engaged in transmitting, are held, and an amplified interference frequency spectrum is by the jamming transmitter in the subsequent jamming interval radiated over the respective ascertained channels. The searching and jamming time intervals may periodically alternate in rapid succession, for example, in the order of magnitude of a few milliseconds.

The system according to the copending application entails a relatively great expenditure, since the supervision and jamming of a wide frequency band requires for the frequency analysis a great number of narrow channels and therewith a correspondingly great number of amplifiers and channel filters.

In order to reduce this expenditure, the prior copending application proposes to carry out the frequency analysis in a lower frequency position, after one or several transformations of the received frequency, and to effect at the transmitter side a reformation of the received frequency into the original frequency position. This may be done by subdividing the frequency measuring range or interference range, respectively, by repeated frequency transformation, into different intermediate frequency positions, so as to form groups of identical channels, for example, preliminary groups, basic groups, superior groups, etc., thus permitting for the respective channels the use of structurally similar component parts which recur repeatedly in the various channels. However, the expenditure required in such arrangement is still quite high.

The object of the present invention is to achieve a considerable reduction of expenditure for the frequency analysis at the receiver side and a like reduction of expenditure for the production of the frequency spectrum at the transmitter side.

The present invention proposes a solution for the problems involved, which is based upon a plural utilization of filter and amplifier groups in the manner of the time-division multiplex technique. According to the invention, the frequency range which is to be searched is, after transformation into a lower fixed frequency position, subdivided into a plurality of individual ranges, and such individual ranges are searched in lower frequency position in definite sequence, with the aid of the same groups of channels. A corresponding subdivision is effected at the transmitter side. The searching can be effected, upon transformation to the lower frequency position, by appropriately changing the transformation frequency by switching-over or the like. The advantage resides in that the same group of channels can be utilized for the frequency analysis in each of the individual ranges, by always transforming the individual ranges to this same group. This results in a reduction of the number of the required channels by a factor which is equal to the number of individual ranges into which the frequency range which is to be searched, is subdivided. For example, if the frequency range is subdivided into five individual ranges, the number of channels will be reduced to one-fifth of the channels required in the arrangement according to the copending application.

In accordance with the invention, the broad frequency range which is to be jammed is sub-divided at the transmitter side into corresponding interference or jamming frequency ranges. These jamming frequency ranges at the transmitter side are subdivided into corresponding jamming channels as at the receiver side. The jamming channels may be obtained by frequency transformation from a channel with interference modulation, for example, from the spectrum of a noise generator. A number of jamming channels is thereby used, which corresponds to the number of channels operating in lower frequency position at the group of channels at the receiver side, such jamming channels being transformed into the corresponding jamming frequency ranges as the individual ranges at the receiver side.

Further features and details of the invention will appear from the appended claims and from the description which is rendered below with reference to the accompanying drawings, showing embodiments thereof.

Figure 1:
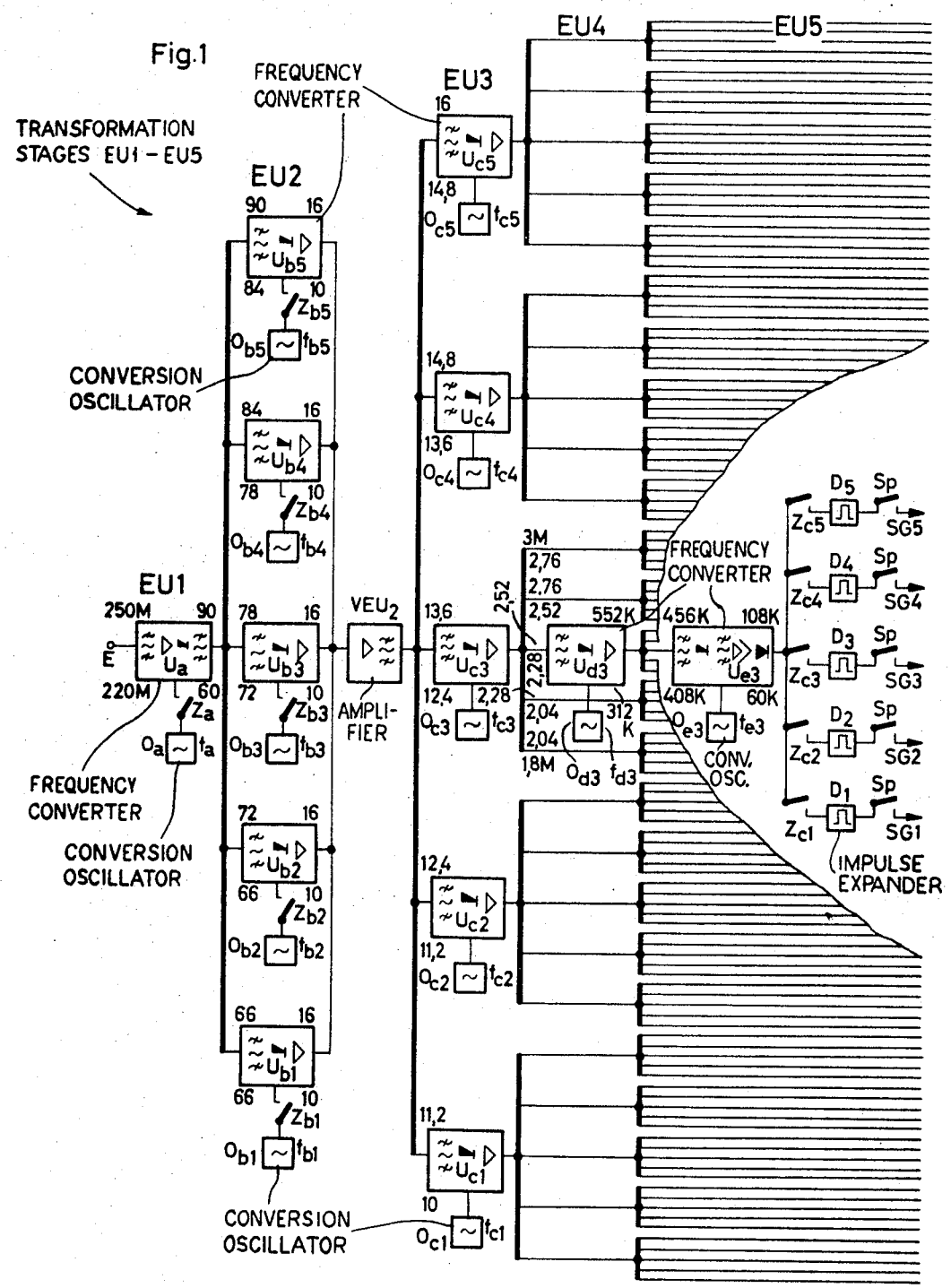
FIG. 1 shows in block diagram manner a receiver arrangement according to the invention.

The receiver arrangement according to FIG. 1 is designed for searching a frequency range a width of 30 megacycles which extends from 220 to 250 megacycles. This frequency range, in the illustrated embodiment, is 6 megacycles, and is subsequently ... transformed in lower frequency position to a group of 125 channels, each with 48 kilocycles band width. This is accomplished in five transformation stages EU1 ... EU5. The received voltage is from a receiving antenna conducted to the input terminal E and reaches the frequency converter $U_a$ in the first conversion or transformation stage EU1, in which it is transformed into a fixed first intermediate frequency position from 60 to 90 megacycles, such transformation being effected by a transformation frequency $f_a$. A timing switch $Z_a$ is operative to connect the oscillator $O_a$ and therewith the reception, for the duration of a searching or tracking interval, while disconnecting the oscillator during the jamming transmission interval.

The next conversion or transformation stage EU2 employs for the scanning or tracking of the regions a transformation arrangement which can be switched over. This arrangement comprises a plurality of parallel connected frequency converters $U_{b1}$ ... $U_{b5}$, corresponding in number to the number of individual searching or tracking times. Said converters include conversion oscillators $O_{b1}$ ... $O_{b5}$, which have respective operating frequencies of $f_{b1}$ ... $f_{b5}$, which oscillators are respectively operatively connected and disconnected, in the rhythm of the individual searching times, by means of the timing switches $Z_{b1} \ldots Z_{b5}$. The individual ranges 60–66; 66–72; 72–78; 78–84 and 84–90 megacycles are by these converters successively transformed to a second intermediate frequency range of 10–16 megacycles, which is the same for all individual ranges, and which is amplified in an amplifier $VEU_2$.

The second intermediate frequency range is in the third conversion or transformation stage EU3 subdivided into five ranges of 10–11.2; 11.2–12.4; 12.4–13.6; 13.6–14.8 and 14.8–16 megacycles and transformed into a third intermediate frequency range of 1.8–3 megacycles, such subdivision being effected by five converters $U_{c1} \ldots U_{c5}$ by conversion or transformation frequencies $f_{c1} \ldots f_{c5}$ from oscillators $O_{c1} \ldots O_{c5}$, thus resulting in five third inter-mediate frequency groups.

Each of the five intermediate frequency groups is sub-divided, in the fourth conversion or transformation stage EU4, into five ranges of 1.8–2.04; 2.04–2.28; 2.28–2.52; 2.52–2.76 and 2.76–3.0 megacycles. The resulting 5 times 5 ranges are converted into a fourth intermediate frequency range of 312–552 kilocycles, by 25 further frequency converters, of which only one converter $U_{d3}$ with a conversion oscillator $O_{d3}$ and a conversion frequency $f_{d3}$, is shown in FIG. 1.

Each fourth intermediate frequency range is, ahead of the fifth conversion or transformation stage EU5, subdivided into five ranges of 312–360; 360–408; 408–456; 456–504 and 504–552 kilocycles, thus resulting in 25 groups each with five channels each with a 48 kilocycles width.

These 125 channels are by means of 125 further frequency converters, of which only the converter $U_{e3}$ with an oscillator $O_{e3}$ and a conversion frequency $f_{e3}$ is shown, converted to 125 channels in a fifth intermediate frequency range of 60–108 kilocycles. These channels are mutually similar and correspond, for example, to the basic or fundamental groups of carrier frequency communication systems.

All individual ranges of the frequency range which is to be searched are successively analyzed with the aid of this common group of 125 channels, by switching over the conversion or transformation frequencies. In the absence of the switching-over according to the invention, there would be required 625 channels for the searching of the same frequency range.

Each of the frequency converters in the individual conversion or transformation stages, comprises in known manner amplifiers and filters of the indicated higher and lower frequency positions and band widths, as well as a mixing- and superposing part to which is connected the respective conversion oscillator.

In the operation of the arrangement, the oscillator frequency $f_a$ is by way of the timing switch $Z_a$ operatively connected, for example, for a searching interval of 0.5 millisecond, and the five oscillator frequencies $f_{b1} \ldots f_{b5}$ are operatively connected with the respective converters, each for one-fifth of the searching interval, that is, for about 0.1 millisecond. The frequency regions 60–66 mc; 66–72 mc; 72–78 mc; 78–84 mc and 84–90 mc are in this manner successively converted or transformed to the second intermediate frequency of 10–16 megacycles. During the first one-fifth of the searching or tracking interval, reception of the band 60–66 megacycles is effected, for example, by way of the converter $U_{b1}$, while the other four converters do not receive oscillator voltage and are thus inoperative. This partial range of 60–66 megacycles is after three further band subdivisions and conversions transferred to 125 channels or fundamental groups each with 60–108 kilocycles. Each of these channels or channel groups has five output circuits, each of which is allotted to an individual range and connected with the respective individual range by way of timing switches $Z_{c1} \ldots Z_{c5}$, the connections being effected in the receiving switching rhythm, simultaneously with the respective individual ranges. The output circuits in which transmitter frequencies are ascertained, are for the entire range held for the duration of one or more supervision intervals or periods. A supervision interval or period is understood to cover the time during which the entire frequency range is tracked or searched once or jammed by the transmission of jamming frequency. The holding or storing of the output circuits can be effected by delay action which is in the present case brought about by impulse expanders $D_1 \ldots D_5$ which are respectively serially connected with the timing switches $Z_{c1} \ldots Z_{c5}$.

Figure 2:
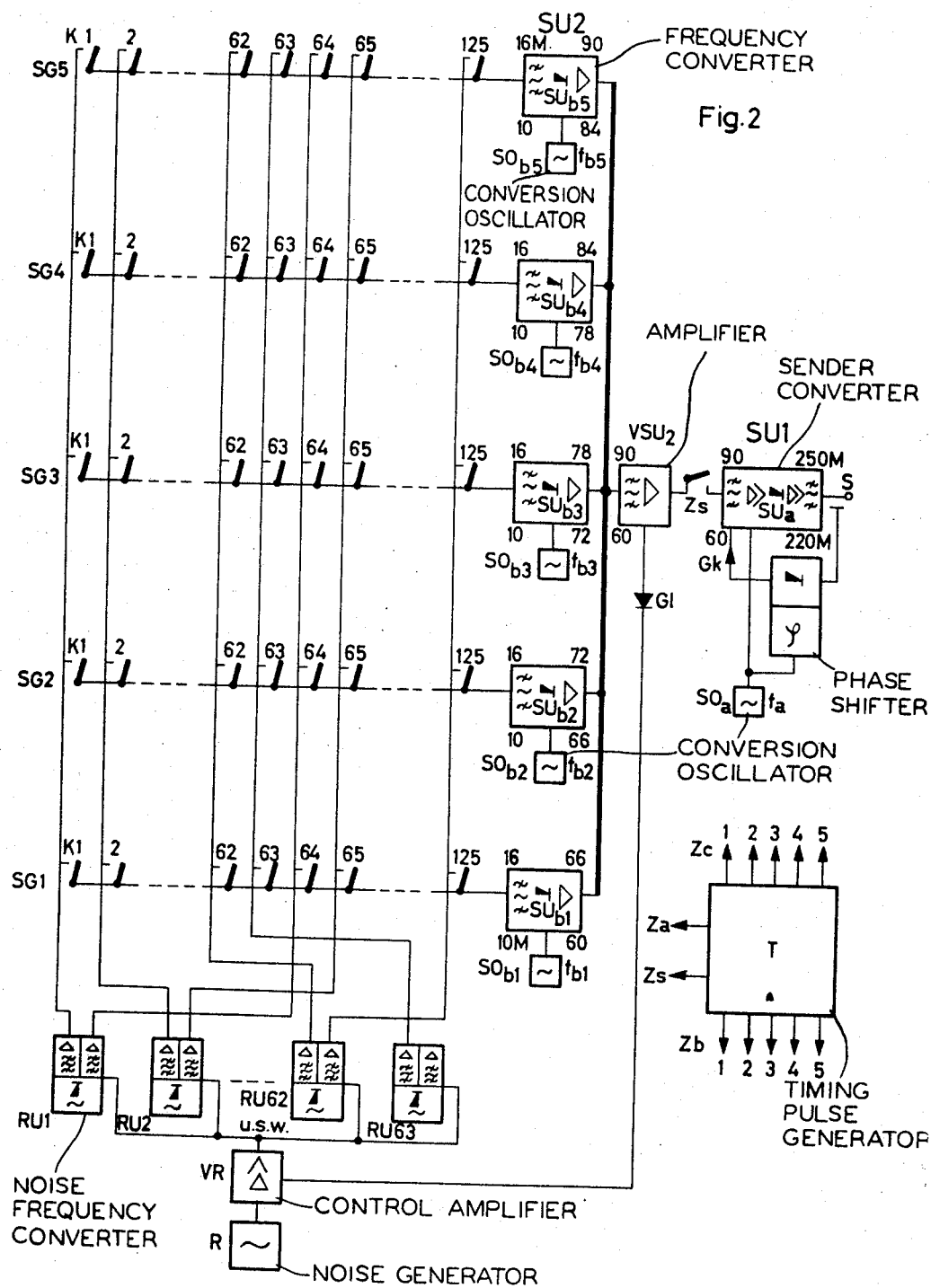
FIG. 2 illustrates an embodiment of a cooperating transmitter arrangement.

The transmitter or sender arrangement shown in FIG. 2 comprises five sender groups $SG_1 \ldots SG_5$, each group having 125 channel switches $K_1 \ldots K_{125}$. Character R indicates a noise generator and VR a control amplifier for the spectrum thereof, such spectrum being utilized to form, with the aid of 63 frequency converters RU1 ... RU63, 125 noise channels in the range of 10–16 megacycles, each with 48 kilocycles band width. Two noise channels are obtained from each frequency converter owing to the upper and lower side bands produced upon frequency conversion or transformation of the spectrum of the noise generator R.

The channel switches $K_1 \ldots K_{125}$, for switching-in the channels, are in the illustrated example arranged in a crossbar distributor which is in one coordinate direction provided with longitudinally extending bars corresponding in number to the number of individual searching or tracking times, there being in the present case five such longitudinal bars. Transverse bars are provided in the other coordinate direction, the number of such latter bars (125) corresponding to the number of noise channels which are connected with the outputs of the noise frequency converters RU1 ... RU63. The channel switches $K_1 \ldots K_{125}$ are combined in groups $SG_1 \ldots SG_5$ which correspond to the jamming frequency ranges. The actuating windings for the channel switches of the individual sender groups $SG_1 \ldots SG_5$ are synchronously connected, by means of the timing switches $Z_{c1} \ldots Z_{c5}$ (FIG. 1), with the corresponding five output circuits of the receiving channels, the channel switches being thus operatively controlled by the output circuits of the receiving channels. Each jamming or interference channel can therefore be switched through, by the respective transverse bar, to each longitudinal bar.

There are provided frequency converters $SU_{b1} \ldots SU_{b5}$, cooperating with conversion oscillators $SO_{b1} \ldots SO_{b5}$, for the conversion of the switched-through jamming channels to the individual ranges which are swept over in the conversion at the receiver, such frequency converters being connected to the outputs of the respective longitudinal bars of the crossbar distributor and the outputs thereof being interconnected as shown. These frequency converters effect, in the frequency conversion stage $SU_2$, conversion of the five jamming frequency bands, from their position in the range of 10-16 megacycles, into the successive jamming frequency ranges 60–66, 66–72, 72–78, 78–84 and 84–90 megacycles. The entire band of 60–90 megacycles is amplified in an amplifier $VSU_2$ and is by way of the sender switch Zs connected to the sender converter $SU_a$ which is connected with the sender antenna S from which are radiated the jamming frequencies in the range from 220 to 260 megacycles. A sender conversion oscillator $SO_a$ produces the required conversion frequency $f_a$. A beat or timing pulse generator T controls the operation of the timing switches $Za, Zb, Zc, Zs$ in the sequence indicated. A linearized feedback GK is branched off from the terminal stage of the sender and carried back to the intermediate frequency part thereof, the optimum adjustment being effected by means of a phase shifter $\phi$. The output power of the sender is appropriately held constant by means of an automatic amplifier control, since the switching in of the number of jamming channels can rapidly and strongly fluctuate. An amplifier control voltage is for this purpose branched off at the amplifier $VSU_2$, ahead of the sender converter $SU_a$, by way of a rectifier G1, acting on the regulation or control amplifier VR cooperating with the noise generator R, whereby the output voltage is so regulated that the sender operates always with maximum output power irrespective of the operative connection and disconnection of jamming channels.

The system according to the invention can be operated so that all individual ranges are searched once during a searching or tracking interval, step-by-step, and thereupon transmission of jamming frequencies is effected. Another possibility resides in transmitting jamming signals in an ascertained individual range immediately or after a given delay, after each individual searching interval, and continuing, after each interruption caused by the next individual searching interval, the jamming of the previously ascertained channels. Accordingly, all individual ranges are in the first case searched before the switching over to jamming transmission, while jamming signals are in the second case transmitted after the searching of each individual range, in the channels ascertained thereby, the jamming transmission being briefly interrupted so as to effect subsequent searching of the individual ranges, and being after each interruption resumed with respect to newly ascertained channels and also in the previously operatively connected channels.

The individual ranges can be successively searched in any desired sequence. It is, for example, possible to continuously successively search mutually bordering individual ranges, by continuously successively operatively connecting rising or falling conversion frequencies during the individual searching intervals. It is also possible to intermix the individual searching intervals with the respectively allotted conversion frequencies, so as to increase the difficulties attending preventive steps taken by the jammed parties.

Figure 3:
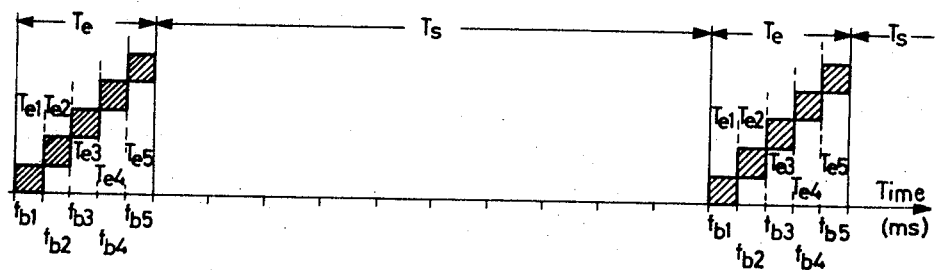
FIG. 3 represents a timing plan for the transmitting and receiving times.

In accordance with the timing plan shown in FIG. 3, all individual ranges are during a searching interval Te searched once, in brief individual searching intervals $Te_1 \ldots Te_5$, with the conversion frequencies $f_{b1} \ldots f_{b5}$, whereupon the arrangement is switched over to jamming in the ascertained channels, at least for a jamming transmission interval Ts. After the jamming transmission interval Ts follows the next searching interval Te and jamming is for some time continued in the following interval Ts also in one or more of the channels ascertained in the course of one or more previous individual searching times. The duration of the jamming transmission intervals Ts can be altered regularly or irregularly. It is not necessary to operate, as indicated in FIG. 3, with continuously rising or falling conversion frequencies; the sequence of the searching of the ranges may be intermixed as desired.

Figure 4:
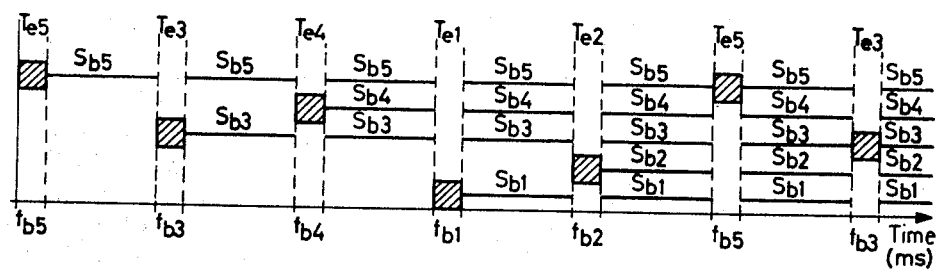
FIG. 4 shows a timing plan for differently selected transmitter and receiving intervals.

The operation according to the timing plan shown in FIG. 4 provides after each individual searching interval $Te_1 \ldots Te_5$ immediate jamming transmission in the ascertained channels of the corresponding individual ranges. Accordingly, there is in this case no continuous searching time in which all individual ranges are successively searched, but the individual searching times are distributed over a supervising period. As indicated, jamming transmission is after each interruption by the next successive individual searching interval, continued in the previously ascertained channels. This mode of operation effects jamming transmission in individual jamming intervals $S_{b1} \ldots S_{b5}$. The duration of these individual jamming intervals, which are indicated in FIG. 4 as being of equal length, can also be varied so as to increase the difficulties attending preventive measures taken by the jammed parties.

The conversion frequencies $f_a$ of the terminal frequencies at the sender and receiver sides may be advantageously synchronously wobbled, preferably by the frequency from a common oscillator which is wobbled and take the place of the separate oscillators $O_a$ and $SO_a$. The advantage obtained thereby resides in that gaps are avoided between the channels in the supervised frequency range.

Changes may be made within the scope and spirit of the appended claims which define what is believed to be new and desired to have protected by Letters Patent.

We claim:

1. In a system for jamming wireless communications with the aid of a searching receiver for ascertaining senders which are engaged in the transmission of messages, a powerful jamming transmitter for radiating jamming signals on the waves of ascertained senders, whereby said receiver and transmitter are alternately operative to ascertain transmitting senders and to transmit jamming signals, respectively, which comprises means at the searching receiver for converting received frequency signals into lower frequency ranges, means for successively converting said lower frequency range signals into a plurality of individual ranges, means forming a group of frequency-analyzing channels, means for connecting said frequency-analyzing channel means to respective outputs of said plurality of individual ranges, whereby each individual range is searched for frequencies therein by the common group of frequency-analyzing channels, means operatively connected to said frequency-analyzing channel means responsive upon ascertainment of a signal thereby, to effect jamming transmission corresponding to the received frequency of such ascertained signal.

2. A system according to claim 1, comprising means for controlling said frequency converting means, said channel connecting means and said transmission means to effect a searching during a searching interval, in step-by-step manner, within brief individual searching times corresponding to the switching-in instants of conversion frequencies, to ascertain transmitting senders, and effecting a jamming transmission only after completion of the searching of all individual ranges.

3. A system according to claim 1, comprising means for transmitting controlling said frequency converting means, said channel connecting means, and said transmission means to effect a transmission of jamming signals in ascertained channels after each individual searching interval, transmission of jamming signals being interrupted by subsequent searching intervals and being after such interruptions resumed in the corresponding channels including previously ascertained channels.

4. A system according to claim 1, wherein the channel connecting means is so constructed that individual searching intervals are successively effected with continuously rising conversion frequencies.

5. A system according to claim 1, wherein the channel connecting means is so constructed that individual searching intervals are effected with intermixed conversion frequencies.

6. A system according to claim 1, wherein each channel of said group of channels has a number of output circuits corresponding to the number of individual ranges, each output circuit being respectively allocated to an individual range and being synchronously operatively switched therewith.

7. A system according to claim 6, comprising impulse expander means operatively connected to said channel-forming means for holding output circuits, in which sender frequencies are ascertained, for the duration of one or more supervision periods for the entire range.

8. A system according to claim 1, wherein said first mentioned frequency converting means comprises a plurality of parallel connected frequency converters, corresponding in number to the number of individual searching times and operating with mutually different conversion frequencies, and means for respectively operatively connecting and disconnecting said converters in the rhythm of the individual searching times.

9. A system according to claim 1, wherein said transmission means is so constructed that the frequency range which is to be jammed is at the jamming transmitter subdivided into jamming frequency ranges with jamming channels corresponding to the same channel distribution as at the searching receiver.

10. A system according to claim 9, comprising means for obtaining the group of jamming channels at the jamming transmitter by frequency conversion from a channel with interference modulation.

11. A system according to claim 10, wherein the jamming channels are formed by upper and lower side bands appearing incident to the frequency conversion.

12. A system according to claim 11, comprising means for converting the group of jamming channels into jamming frequency ranges corresponding to individual ranges at the receiver side.

13. A system according to claim 12, comprising channel switches for operatively connecting the jamming channels, means for combining said channel switches in groups corresponding to the jamming frequency ranges, and means in the output circuits for operatively controlling said channel switches.

14. A system according to claim 13, wherein the conversion frequencies at the respective receiver- and transmitter terminal frequencies are synchronously wobbled by a frequency supplied by a common oscillator.

15. A system according to claim 14, wherein the channel connecting means is so constructed that individual search intervals are successively effected with continuously falling conversion frequencies.

16. A system according to claim 13, comprising means disposed in the manner of a crossbar arrangement for disposing said channel switches.

17. A system according to claim 16, wherein said crossbar arrangement is formed by a crossbar distributor which comprises, in one coordinate direction, longitudinal bars corresponding in number to the number of individual ranges, and in the other coordinate direction transverse bars corresponding in number to the number of jamming channels for the respective individual ranges, means for connecting said transverse bars with the jamming channels, said channel switches being operative for connecting each jamming channel with each longitudinal bar.

* * * * *